TRANSLATOR

Filed Dec. 26, 1961 3 Sheets-Sheet 1

INVENTORS R. C. AVERY
R. H. GUMLEY
A. MAJLINGER
BY Howard R Popper
ATTORNEY

TRANSLATOR

Filed Dec. 26, 1961

3 Sheets-Sheet 2

INVENTORS R. C. AVERY
R. H. GUMLEY
A. MAJLINGER
BY Howard R Popper
ATTORNEY

INVENTORS R. C. AVERY
R. H. GUMLEY
A. MAJLINGER
BY Howard R Popper
ATTORNEY

3,156,898
TRANSLATOR

Robert C. Avery, Jackson Heights, N.Y., Robert H. Gumley, Allendale, N.J., and Anthony Majlinger, Long Island City, N.Y., assignors to Bell Telephone Laboratories, Incorporated, New York, N.Y., a corporation of New York Filed Dec. 26, 1961, Ser. No. 162,162
29 Claims. (Cl. 340—172.5)

This invention relates to translator circuits and, more particularly, to translator circuits which selectively effect the transfer of information between one or more of a plurality of input conductors and one or more of a plurality of output conductors.

A general object of this invention is the improvement and simplification of such translator circuits to permit adaptability to a wide variety of information translating arrangements.

Translation of information basically involves detecting input information in a first coded form and providing predetermined output information in a second coded form. The correspondence between the input and output information, that is, the input-output or translation code relationship, is stored in the translator memory. In some applications, the translation relationship is one of code conversion to translate input information in a first code into output information in a second code. The content of the information remains the same; that is to say, there is a systematic correspondence between the input and the output information. However, in a greater multitude of applications in the areas of communications, switching, data processing, data handling and the like, the translation relationship is not merely one of code conversion, but rather is one of providing output information having a content distinct from that of the input information, though in the same or a different code. In the latter applications, the input information may be thought of as an index code for selecting a location in the translator memory and providing for the read-out of the output information stored thereat which has no systematic correspondence to the input information. A particular example is in the common-controlled type of telephone switching system where the office code digits dialed by a subscriber are translated into various instructions which permit the equipment to locate and establish a call over one of the trunks to the called office.

In conventional translator circuits, a plurality of input conductors are physically and electrically connected in a predetermined order to a plurality of output conductors by individual switching or isolation elements comprising one or more electrical components, e.g., diodes, resistors, relay contacts, capacitors or the like. Thus the input and output conductors bear a predetermined fixed code relationship to each other, and information may be transferred between the input and output conductors in accordance with the translation code. The number of electrical components and connections required to provide the individual translations dictates the size, complexity and cost of the translator circuit, and in some cases limits the capacity of the translator circuit. Moreover, it is a usual requirement that the individual elements be of identical value or have substantially uniform electrical characteristics. Where, for example, it is a desired that the translator circuit be of printed circuit form, there has been considerable difficulty encountered in achieving the requisite uniformity.

It is, therefore, an object of our invention to provide a simple, compact and economical translator which may be utilized to perform a wide variety of information translation operations.

It is another object of our invention to provide a large capacity, high-speed, solid-state translator while minimizing the number of circuit elements and connections required.

Further, it is an object of our invention to provide a translator which does not require fixed physical connections between the input and output conductors.

Yet another object of our invention is to provide a translator which may be readily manufactured in printed circuit form.

As mentioned above, it is often desirable to translate information from a first coded form to a second coded form. It is often further desirable to translate the information subsequently from the second coded form back to the first. In prior equipment arrangements where translator circuits have been employed using unilateral circuit elements such as diodes, one translator circuit has been used to convert from the first coded form to the second coded form, and another and distinct translator has been used to convert from the second back to the first. A more desirable arrangement, of course, from the standpoint of circuit bulk and economy is to effect the two translations through the use of a single two-way translator circuit. Accordingly, a further object of our invention is to provide a simple, compact, economical translator which is fully reversible in operation; i.e., which is capable of two-way translation using a single memory circuit.

Another consideration that is of considerable importance with regard to numerous translator applications, particularly within the areas of communications and switching, is the ease and facility with which the translator circuitry may be altered or modified to meet changing requirements and changing input-output code relationships. For example, within the telephone art, one of the many areas requiring the use of translation circuitry is that of converting from a subscriber directory number to an equipment location, and vice versa. As a result of subscerbier line reassignments, it often becomes necessary to change the code relationship between the directory numbers and the equipment locations. Prior translator circuits have required wiring or cross-connection changes, necessitating the use of trained personnel therefor, to meet the changes in input-output code relationships. Moreover, it has been found necessary in some translator arrangements to remove all or part of the translator circuit temporarily from operation to effect such changes.

It is thus a further object of this invention to provide a translator having a high degree of flexibility wherein the individual input-output code relationships may be readily and quickly established, changed or discontinued.

A still further object of this invention is to provide a translator wherein any of a plurality of input-output code relationships may be readily and quickly established, changed or discontinued without affecting or interfering with the operation of the remaining input-output code relationship.

In accordance with the present invention, these and other objects are attained in part through utilization of the mechanism of electrical discharge breakdown of gaps to identify combinations of electrical input signals and to provide appropriate output signals in accordance therewith. The breakdown gaps are defined by a pair of conductive electrodes which are separated in a gas, such as air, by some finite distance. As is well known, an electrical potential applied between the pair of electrodes, and of a magnitude determined by the pressure-distance characteristic of the gap, will effect the breakdown of the gap and provide a self-sustained discharge of low current density as determined by the circuit and gap impedances. This discharge, which is often referred to as a glow discharge, is described, for example, in L. B. Loeb, Fundamental Processes of Electrical Discharge in Gases, John Wiley and Sons, Inc., 1939.

One embodiment of the present invention comprises a plurality of input conductors, a plurality of output conductors, and a plurality of electrodes positioned with respect to the input and output conductors so as to define particular combinations of input and output breakdown gaps in accordance with a translation code. Unique combinations of input signals are applied to the input conductors to effect the electrical discharge breakdown of corresponding combinations of input gaps. The breakdown of a particular combination of input gaps selects and permits the breakdown of an associated combination of output gaps, thereby providing output signals on the output conductors bearing a predetermined relationship to the input signals.

Thus, the present invention is directed toward interconnected arrays of breakdown gaps employed as memory and isolation elements in a translator circuit. The individual breakdown gaps isolate the input circuitry from the output circuitry and establish a translation code relationship between the input and output information. The transfer of information from the input circuitry to the output circuitry in accordance with the translation code relationship is effected only upon breakdown of the individual gaps by voltage of a magnitude determined by the pressure-distance characteristic of the gap. We have found that, for a given voltage, the gap distance need not be accurately maintained to provide the desired isolation and breakdown characteristics, but may vary over a relatively wide range of gap distances if a large resistance is connected immediately adjacent the gap. In fact, with a large resistance serially connected immediately adjacent the memory element gap as discussed further below, we have found that the two electrodes defining the memory element may even be in a touching relationship, establishing electrical contact, and yet still provide the desired isolation and memory characteristics in the present circuit. Thus, the memory elements in the translator memory are defined by individual pairs of electrodes which randomly establish electrical contact or form breakdown gaps. This lack of required uniformity between the various memory elements in the translator circuit permits it to be manufactured readily and economically, particularly in printed circuit form.

As illustrated in one embodiment of our invention, to be discussed in detail hereinbelow, the memory elements are defined by electrodes printed on cards which are positioned with respect to a plurality of grid wire conductors. Resistance elements are printed on the cards in series with the individual electrodes and are located contiguous with that part of the individual electrode which defines a breakdown gap or establishes contact with a grid wire conductor. In a translator circuit of this general structure the necessary electrical coupling between the input and output circuitry is established advantageously solely by the placement of the printed circuit cards relative to the input and output circuitry. No mechanically binding connections therebetween are necessary. Accordingly, changes in the translation arrangement are readily effected by the simple removal and replacement of one or more printed circuit cards. This permits changes to be made in the translator memory by persons who need not be specially trained technical or maintenance personnel.

A further and important advantage derived from the structure of the present invention is a more precise control of the discharge breakdown characteristics of the gap. This control assures that the discharge breakdown of the gap will remain in the high voltage, low current density region of the characteristic, known as the glow discharge region. This region of the gap discharge characteristic, in contrast to the low voltage, high current density arc region, is known to be harmless to the wiring and components in the translator circuitry. A large resistance placed in series with the gap limits the current upon breakdown of the gap. However, we have found that if the resistance is connected too distant from the gap, when breakdown occurs, the capacitance of the wiring between the resistance and the gap tends to discharge a rather high current through the gap in a low voltage arc. When a low current source is employed, the limited current available after breakdown is insufficient to maintain the arc and it extinguishes. The wiring capacitance may again charge and discharge in an arc through the gap. The relaxation oscillations produced thereby are injurious to the wiring and translator components, and little or no usable output is produced. The present invention overcomes this difficulty by providing for a breakdown memory element comprising a large resistance connected in series with, and immediately adjacent to the gap. This limits the gap current during breakdown and for the duration of the glow discharge, thereby preventing the formation of an arc and producing a usable output signal.

Accordingly, a feature of this invention relates to translation circuitry utilizing electrical discharge breakdown gaps to identify particular combinations of electrical input signals and to provide appropriate output signals in accordance therewith.

More particularly, it is a feature of our invention that a translator circuit comprise an array of memory elements arranged in accordance with a translation code, each such memory element comprising a resistance connected in series with and immediately adjacent to a breakdown gap defined by two electrodes.

A further feature of our invention relates to a serially-connected resistance element and electrical discharge breakdown gap employed as an isolation device to permit the selective transfer of information from one circuit to another.

Another feature of our invention relates to a translator circuit employing printed circuit cards having electrode elements printed thereon and positioned with respect to a plurality of grid wire conductors so as to define predetermined combinations of translator memory elements.

Yet another feature of our invention relates to a translator circuit employing printed circuit cards to provide the translator memory wherein the necessary electrical coupling is established solely by the physical placement of the cards relative to the input and output circuitry of the translator.

A further feature of the present invention relates to a circuit for transferring information comprising an input conductor connected through an isolation device to an output conductor wherein the isolation device includes a high resistivity element in series with a pair of terminals in random surface proximity with each other.

A still further feature relates to a translator circuit employing interconnected input and output arrays of breakdown gap memory elements to provide bilateral translation.

It is another feature of our invention that a large capacity, multidigit memory for a translator circuit comprise a plurality of groupings of small units of memory, each representing an individual digit or combination of digits. This permits a more compact and economical translator circuit for those applications requiring appreciably less than the maximum capacity of the memory, and further provides units of memory which are readily interchangeable.

A further feature of the present invention relates to the control circuitry for selecting a desired combination of breakdown gaps.

The above and other objects and features of the present invention will be better understood upon consideration of the following detailed description and the accompanying drawing, in which.

Figures 1, 2:
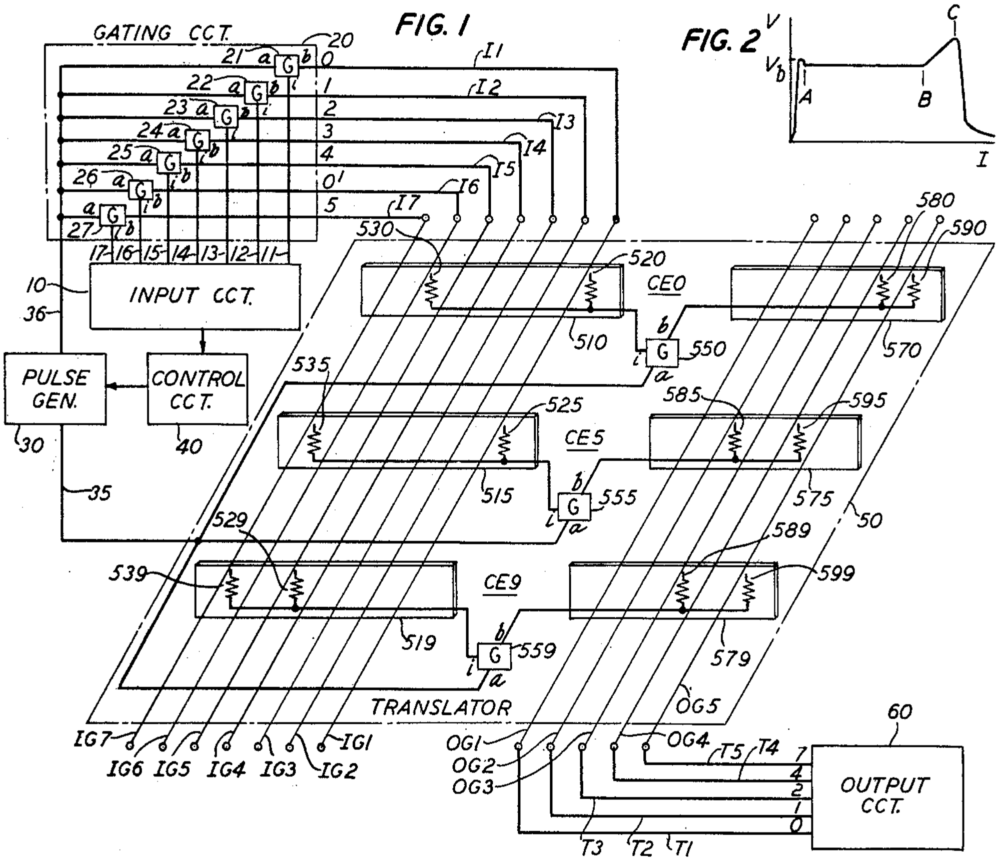
FIG. 1 is a schematic block diagram of an illustrative embodiment in accordance with the principles of our invention.
FIG. 2 is a graphical representation of a typical voltage-current characteristic for electrical discharge across a breakdown gap.

Referring now to FIG. 1 of the drawing, an illustrative block diagram is shown of a translator circuit employing the principles of our invention. The particular embodiment shown in FIG. 1, by way of example, is a circuit for receiving input information in the well-known biquinary code and for translating it into output information in two-out-of-five code, the content of the input and output information remaining the same. It will be apparent from the discussion hereinbelow, however, that the principles of our invention may be employed advantageously to effect translation between input information of any desired code and content and corresponding output information of any desired code and content. The translation performed by the embodiment of FIG. 1 may be readily apprehended from the code relationship between the biquinary and the two-out-of-five codes, as shown in Table I for the integral decimal digits 0 through 9.

*Table I*

| Decimal Digit | Biquinary 5043210 | Two-Out-of-Five 74210 |
|---|---|---|
| 0 | 0100001 | 11000 |
| 1 | 0100010 | 00011 |
| 2 | 0100100 | 00101 |
| 3 | 0101000 | 00110 |
| 4 | 0110000 | 01001 |
| 5 | 1000001 | 01010 |
| 6 | 1000010 | 01100 |
| 7 | 1000100 | 10001 |
| 8 | 1001000 | 10010 |
| 9 | 1010000 | 10100 |

The embodiment in FIG. 1 comprises input circuit 10 which provides input information through gating circuit 20 on input leads I1 through I7 in biquinary code for translation into two-out-of-five code. Each biquinary digit to be translated includes seven bits of information which appear respectively on leads I1 through I7. The numeral adjacent each of these leads in FIG. 1 indicates the relative weight of an information bit appearing on the lead. Upon translation by translator 50, an output digit in two-out-of-five code is provided on output leads T1 through T5 to output circuit 60, the numeral adjacent each of leads T1 through T5 indicating the relative weight of a bit of information appearing on the lead.

An important aspect of the present invention resides in translator 50 which comprises input grid wire conductors IG1 through IG7, output grid wire conductors OG1 through OG5, and control devices CE0 through CE9. For purposes of clarity and to facilitate description of the present invention, only control devices CE0, CE5 and CE9 are shown in FIG. 1. The input grid wire conductors IG1 through IG7 are individually connected to respective ones of input leads I1 through I7; and output grid wire conductors OG1 through OG5 are respectively connected to output leads T1 through T5. Control devices CE0 through CE9 are positioned with respect to input grid wire conductors IG1 through IG7 and output grid wire conductors OG1 through OG5 so as to define a plurality of input and output electrical discharge breakdown gaps in accordance with the translation code relationship set forth in Table I. In particular, each of control devices CE0 through CE9 corresponds to a respective one of the decimal digits 0 through 9, and includes a respective input memory 510 through 519, a respective output memory 570 through 579, and a respective inhibit gate 550 through 559.

The input memory of each control device comprises an arrangement of electrodes 520 through 539 corresponding to the respective digit in biquinary code; and the output memory thereof comprises an arrangement of electrodes 580 through 599 corresponding to the respective digit in two-out-of-five code. As will be described in detail below in connection with FIG. 4, input memories 510 through 519 and output memories 570 through 579 may comprise printed circuit cards upon which the arrangements of electrodes are printed. The use of printed circuit cards facilitates the positioning of the electrodes 520 through 539 and 580 through 599 to establish the translator memory. The presence of an electrode positioned adjacent a grid wire conductor so as to define a breakdown gap establishes a translator memory bit corresponding to one binary character representation, e.g., binary "1," associated with that grid wire conductor. Conversely, the absence of an electrode positioned adjacent a grid wire conductor establishes a translator memory bit corresponding to the other binary character, e.g., binary "0," associated with that grid wire conductor.

The electrodes 520 through 539 of each of input memories 510 through 519 are electrically connected to the inhibit terminals *i* of respective ones of inhibit gates 550 through 559. The electrodes 580 through 599 of each of output memories 570 through 579 are electrically connected to the output terminals *b* of respective ones of inhibit gates 550 through 559. The particular structure shown in the illustrative embodiment of FIG. 1, employing inhibit gates 550 through 559 to interconnect input memories 510 through 519 and output memories 570 through 579, advantageously permits the electrodes of each of the input and output memories to be connected in common to respective individual memory connecting leads. The input terminals *a* of each of inhibit gates 550 through 559 are connected in common over lead 35 to pulse generator 30. A high-voltage pulse provided by pulse generator 30 is applied over lead 35 to the terminals *a* of each of gates 550 through 559, which gates are normally enabled and thus permit the passage of the pulse therethrough. If, however, a disabling signal is concurrently applied to the inhibit terminal *i* of all but one of gates 550 through 559, the passage of a high-voltage pulse applied to the terminal *a* of gates 550 through 559 is blocked at all but the one gate which remains enabled. In this manner, a pulse from pulse generator 30 is selectively directed through the particular one of gates 550 through 559 which remains enabled and is provided to the arrangement of electrodes in the particular one of output memories 570 through 579 associated with the enabled gate.

With the structure of FIG. 1 in mind, the operation thereof may be considered. Unique combinations of input signals representing a biquinary digit to be translated are applied by input circuit 10 over leads I1 through I7 to the inhibit terminals *i* of gates 21 through 27, respectively. Each of gates 21 through 27 is substantially similar to gates 550 through 559 and, responsive to a disabling signal applied to inhibit terminal *i*, blocks the passage of pulses between terminal *a* and terminal *b*. Assuming, therefore, that the presence of a disabling signal on one of leads 11 through 17 corresponds to a binary "1" and that the absence of a disabling signal corresponds to a binary "0," the character of the individual bits of the biquinary word from input circuit 10 are reflected in the enabled or disabled condition of gates 21 through 27. Each of gates 21 through 27 to which a bit of binary character "1" is applied is disabled thereby and thus blocks the passage of a concurrently-applied pulse from pulse generator 30 over lead 36. Each of gates 21 through 27 to which a bit of binary character "0" is applied remains in the normally-enabled condition and permits the passage of a concurrently-applied pulse from pulse generator 30 to the corresponding ones of input leads I1 through I7, and to input grid wire conductors IG1 through IG7 connected thereto.

As mentioned above, translator 50 utilizes the mechanism of electrical discharge breakdown of memory element gaps, the individual gaps in the embodiment of FIG. 1 being defined by a grid wire conductor and an electrode positioned adjacent thereto. When a signal is applied to either the grid wire conductor or the electrode defining a memory element gap, of a breakdown magnitude determined by the pressure-distance characteristic of the gap, the gap breaks down and provides a self-sustained discharge of low current density. A typical voltage-current characteristic for a breakdown gap is shown in FIG. 2. As voltage of increasing magnitude is applied across the gap, very little current flows until the breakdown magnitude $V_b$ is reached. At this point the gap breaks down in a so-called glow discharge, characterized electrically by a substantially constant, low current density and a voltage drop less than the breakdown voltage. This condition is maintained over a range of current between points A and B in FIG. 2. For some predetermined value of current, indicated here as point B on the characteristic, the cathode electrode becomes covered with the glow and the current density can no longer remain constant for further increase of current. Thereafter the current density and the voltage drop increase with the current until point C, whereupon a sudden transition takes place to an undesirable arc discharge of rather high current and low voltage.

To assure that the discharge breakdown of the gap remains in the glow discharge region, i.e., the region between points A and B in FIG. 2, a large resistance is connected in series with the gap and is connected adjacent to the gap. This resistance may be on the order of several megohms and functions to limit the gap current during breakdown of the gap and for the duration of the discharge thereacross. In FIG. 1, this serial resistance is included in each of the electrodes 520 through 539 and 580 through 599 in control devices CE0 through CE9 and is contiguous with that portion of each electrode which is positioned adjacent a grid wire conductor to define a breakdown gap. The resistance serially connected adjacent the breakdown gap further functions, as pointed out above, to relieve the necessity for maintaining a precise gap distance between the grid wire conductors and the electrodes. In an illustrative embodiment wherein a 50 microsecond pulse of 7500 volts peak was provided by pulse generator 30 to break down the gaps and a 10-megohm resistance was serially connected adjacent each gap, discharge was maintained in the glow discharge region and a satisfactory output signal on the order of 0.5 milliamps was provided for air gap distances of 0.010±.010 inch. In fact, a usable output signal is produced and adequate isolation is maintained, as pointed out above, even when the gap distances are permitted to vary to the extent that the grid wire conductors and the electrodes are in a touching relationship such that an electrical contact therebetween is formed.

The individual resistance connected in series with each of the breakdown gaps in the translator memory serves the additional function of adding sufficient positive impedance to the negative gap impedance to provide a memory element having an overall positive impedance. This permits a plurality of the memory element gaps to be operated in parallel by a single high-voltage pulse. If the series resistance is not employed, or is too small, each gap must be broken down by an individual high-voltage pulse.

Returning to the operation of FIG. 1, a biquinary digit to be translated is provided by input circuit 10 to inhibit gates 21 through 27 to condition these gates individually to pass or not to pass a pulse from pulse generator 30 to leads I1 through I7. Upon conditioning gates 21 through 27 in accordance with the word to be translated, input circuit 10 signals control circuit 40 which initiates the operation of pulse generator 30 to provide a high-voltage pulse on lead 36. This pulse is passed through the enabled ones of gates 21 through 27 (indicating binary "0's" in the input biquinary digit) and appears on corresponding ones of input grid wire conductors IG1 through IG7. The pulse appearing on the corresponding input grid wire conductors effects the breakdown of each of the gaps defined thereby, producing a signal on the respective ones of electrodes 520 through 539 associated therewith in input memories 510 through 519. Thus, all of the input breakdown gaps defined by grid wire conductors IG1 through IG7 and electrodes 520 through 539 are broken down except those defined by the input grid wire conductors to which the high-voltage pulse is not applied (indicating binary "1's" in the input biquinary digit). Accordingly, at least one electrode in all but one of input memories 510 through 519 will provide a signal to inhibit terminal *i* of the respective gates 550 through 559 connected thereto. In this manner, the input biquinary digit is identified and each of gates 550 through 559 is disabled except the one corresponding to the digit to be translated.

Under control of control circuit 40, pulse generator 30 provides a high-voltage pulse on lead 35 to terminal *a* of each of gates 550 through 559. This high-voltage pulse is directed through the particular one of gates 550 through 559 which remains enabled upon the identification of the digit to be translated and is provided to the two-out-of-five arrangement of electrodes 580 through 599 in the respective one of output memories 570 through 579 associated with the enabled gate. Breakdown of the output gaps defined by this arrangement of electrodes and particular ones of output grid wire conductors OG1 through OG5 is effected thereby, producing output signals on the particular output grid wire conductors. The output signals on grid wire conductors OG1 through OG5 are provided over leads T1 through T5 to output circuit 60, the presence of a signal on an output grid wire conductor indicating a binary "1" and the absence thereof indicating a binary "0."

Assume, for example, that the biquinary word "1000001" is to be translated. This word is applied by input circuit 10 over leads 11 through 17 to the inhibit terminals *i* of gates 21 through 27, and disables gates 21 and 27 in the manner described above. Control circuit 40 initiates the operation of pulse generator 30 to provide a high-voltage pulse on leads 35 and 36. The pulse on lead 36 passes through enabled gates 22 through 26 to input grid wire conductors IG2 through IG6. Reference to Table I shows that at least one electrode in each of input memories 510 through 514 and 516 through 519 is adjacent one of grid wire conductors IG2 through IG6, defining a breakdown gap therewith. Each of these gaps is broken down by the pulse appearing on grid wire conductors IG2 through IG6, and provides a disabling signal to the inhibit terminal *i* of each of gates 550 through 554 and 556 through 559. Electrodes 525 and 535 of input memory 15, however, are not adjacent grid wire conductors IG2 through IG6, but rather define breakdown gaps with grid wire conductors IG1 and IG7, respectively. No high-voltage pulse is present on grid wire conductors IG1 or IG7, and thus no signal is provided to terminal *i* of inhibit gate 555. Accordingly, the high-voltage pulse on lead 35 is passed through gate 555 to electrodes 585 and 595 of output memory 575. The breakdown gaps defined thereby are broken down to provide output signals on output grid wire conductors OG2 and OG4. The high-voltage pulse on lead 35 is blocked from passage to the electrodes of output memories 570 through 574 and 576 through 579, and therefore no output signals appear on output grid wire conductors OG1, OG3, and OG5. Consequently, the output of translator 50 on leads T1 through T5 corresponds to the two-out-of-five word "01010," which reference to Table I indicates as having the proper translation code relationship to the input biquinary word "1000001."

It will be apparent from the above discussion that translator 50 in FIG. 1 may be employed in a similar manner to translate from two-out-of-five code to biquinary code by connecting an input circuit and a gating circuit with a suitable number of inhibit gates to grid wire conductors OG1 through OG5, and by connecting an output circuit to grid wire conductors IG1 through IG7. The only internal circuit alteration necessary in translator 50 is to interchange the control electrode connections to terminals *i* and *b* of gates 550 through 559.

Figure 3:
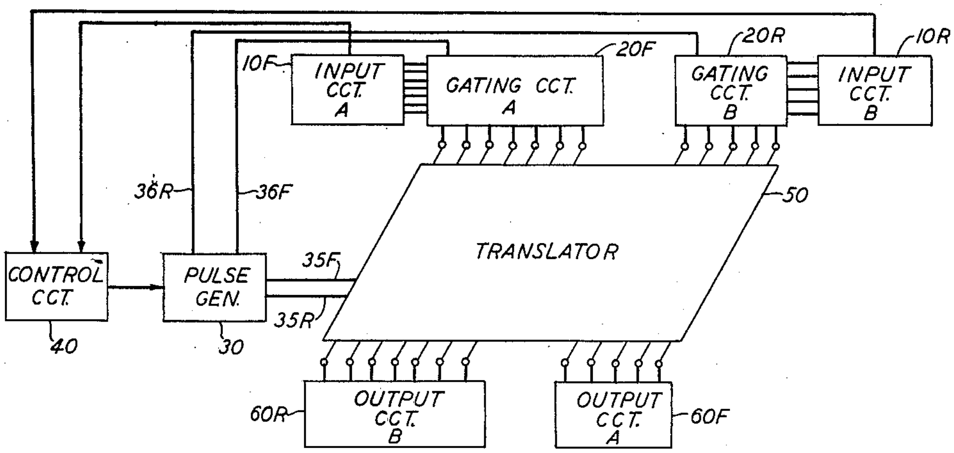
FIG. 3 is block diagram of another illustrative embodiment of the present invention for reversible or two-way translation.

However, as discussed above, it is often desirable to convert back and forth between two coded forms for various applications. Accordingly, a single translator such as shown in FIG. 1, but employing control device gates 550 through 559 which are bilateral in operation, may be utilized to effect two-way translation. Such a two-way translator circuit is illustrated in FIG. 3. High-voltage pulses from pulse generator 30 are applied to the control device gates on either of leads 35F or 35R, depending upon whether forward or reverse translation is desired, and are thereby directed to the appropriate output breakdown gaps. The operation of the embodiment of FIG. 3 for either forward or reverse translation, therefore, is substantially the same as described in connection with FIG. 1. For example, assuming translation in the reverse direction, that is, translation from two-out-of-five to biquinary, input circuit 10R registers the word to be translated on the inhibit gates of gating circuit 20R and signals control circuit 40. The operation of pulse generator 30 is initiated thereby to provide a high-voltage pulse on lead 36R to gating circuit 20R. In the manner discussed above, this pulse is directed to a particular combination of the grid wire conductors connected to gating circuit 20R, breaking down the gaps associated therewith to select a single one of control devices CE0 through CE9 (not shown) in translator 50 corresponding to the word to be translated. A high-voltage pulse from pulse generator 30 on lead 35R is provided to the selected control device to effect the breakdown of the respective arrangement of output gaps therein. A unique combination of output signals is produced thereby on the associated grid wire conductors and provided to output circuit 60R.

Figures 4, 5, 6:
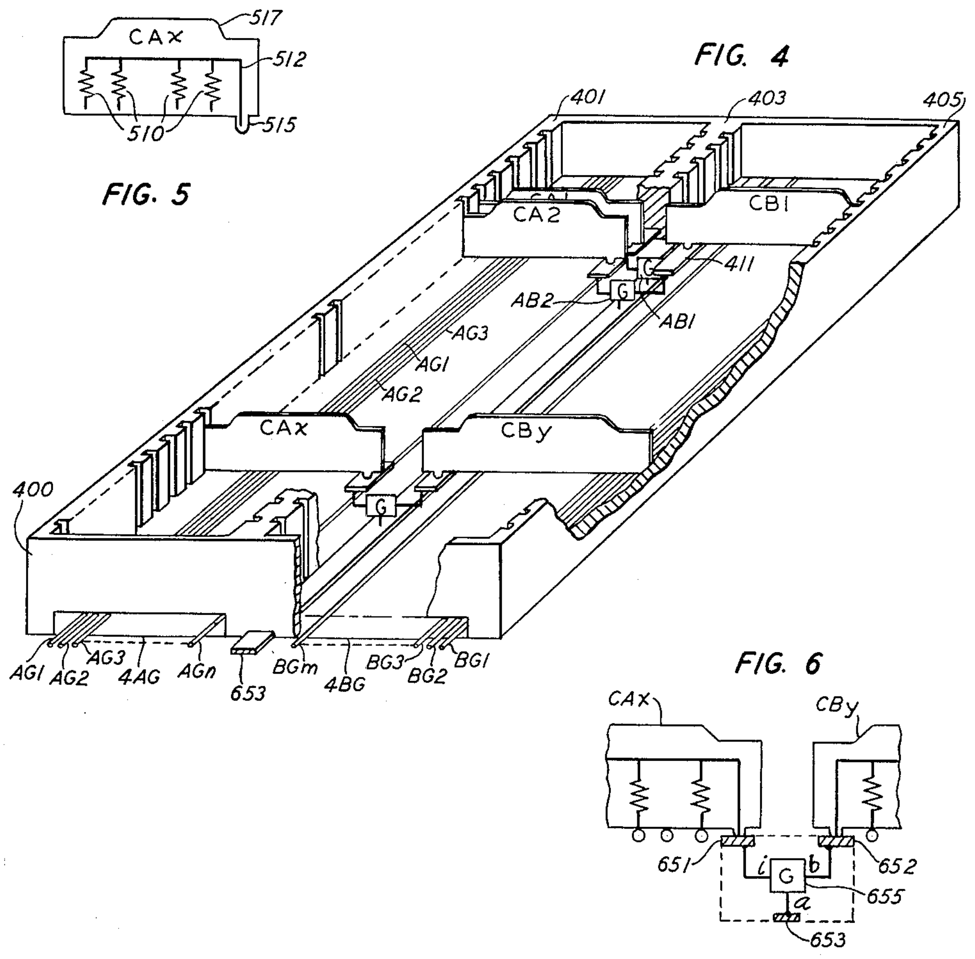
FIG. 4 is a pictorial representation of a portion of an illustrative translator circuit in accordance with the principles of the present invention and showing an illustrative arrangement of the components thereof in greater detail.
FIG. 5 is a representation of a printed circuit card suitable for use in the embodiment of FIG. 4.
FIG. 6 is an enlarged representation of a portion of FIG. 4.

In the illustrative embodiment of FIG. 1, the grid wire conductors, the electrodes and the control device gates are shown in a particular configuration to facilitate description of our invention. It will be apparent from the above, however, that a wide variety of arrangements are possible to suit particular applications of the translator circuit. The grid wire conductors may be arranged in a vertical or a horizontal plane, or in any intermediate plane, and the electrodes arranged in accordance therewith adjacent the grid wire conductors. By way of example, a suitable arrangement employing printed circuit cards for establishing the breakdown gaps in the translator is shown in FIG. 4. Therein the grid wire conductors are positioned at the bottom of a frame or card holder 400. The grid wire conductors are supported in a form of nonconducting material to provide rigidity and to maintain proper spacing and sufficient electrical separation between each of the conductors. For example, the individual grid wire conductors may be molded in a self-setting plastic resin. Advantageously, the grid wire conductors AG1 through AG*n* and the grid wire conductors BG1 through BG*m* are constructed in individual grid wire units 4AG and 4BG, each unit comprising a number of grid wire conductors at least as great as the number of bits in the particular translation codes being utilized. The grid wire conductors AG1 through AG*n* and BG1 through BG*m* are jack-ended or the like to permit ready removal and replacement of either of grid wire units 4AG and 4BG in case of failure.

The arrangement of breakdown gaps for the translator is defined advantageously by electrodes printed on memory cards which are positioned with respect to the grid wire conductors. All of the electrodes and the control device gate for each control device may be printed on individual control device memory cards. However, since the translation operation involves two distinct codes, which shall be referred to as code A and code B, the printed circuit memory cards therefor may be organized into two distinct groups with corresponding designations. One group comprises memory cards CA1 through CA*x* which are individually positioned in card holder 400 adjacent grid wire conductors AG1 through AG*n*, and the other group comprises memory cards CB1 through CB*y* which are individually positioned adjacent grid wire conductors BG1 through BG*m*. Each memory card comprises an arrangement of electrodes 510 printed thereon, as shown in FIG. 5, in accordance with the code word represented by the individual card. Resistance elements may be printed on the cards as a part of the individual electrodes, as represented in FIG. 5, and located contiguous with that part of the individual electrode which is positioned adjacent one of the grid wire conductors to define breakdown gap. Each of the electrodes on a memory card is connected in common through a printed conductor 512 to a jack termination 515. A tab 517 is provided on the card to facilitate handling and to permit the placement of identification characters on the card.

Card holder 400 comprises card support walls 401, 403, and 405, each having slots or grooves therein to accept the individual memory cards and to retain these cards in a position such that each of the control electrodes printed thereon is adjacent a corresponding grid wire conductor and defines a breakdown gap therewith. In this manner the individual memory cards may be readily inserted or removed to effect changes in the translation code relationships; and since the cards operate independently of each other, the individual code A-code B relationships may be readily and quickly established or discontinued without altering or interfering with the operation of the other cards in card holder 400.

Jack termination 515 on each memory card when inserted in card holder 400 engages a conducting strip in the center portion of card holder 400, which is connected to a respective control device gate. An illustrative representation of this portion of card holder 400 is shown in FIG. 6. Conducting strip 651 is engaged by jack termination 515 of printed circuit card CA*x*, and conducting strip 652 is engaged by jack termination 515 of printed circuit card CB*y*. Assuming code A to be the input code and code B to be the output code, strips 651 and 652 are connected to terminals *i* and *b*, respectively, of the associated gate 655. Terminal *a* of gate 655, in common with terminal *a* of each of the other control element inhibit gates interconnecting cards CA1 through CA*x* and cards CB1 through CB*y*, is connected to bus strip 653, which corresponds to lead 35 in FIG. 1.

This arrangement, therefore, permits the advantageous employment of printed circuit cards to establish the translator memory wherein the arrangement of memory element breakdown gaps is established solely by the physical placement of the cards relative to the input and output grid wire conductors. Furthermore, although FIG. 6 depicts the association of a single code A card with a single code B card, conducting strips 651 and 653 can be provided in various lengths to permit the association of a plurality of code A cards with a single code B card. Thus, cards CA1 and CA2 in FIG. 4 are each associated with card CB1, the output terminal of switches AB1 and AB2 both being connected to conducting strip 411 which is engaged by card CB1.

Figure 7:
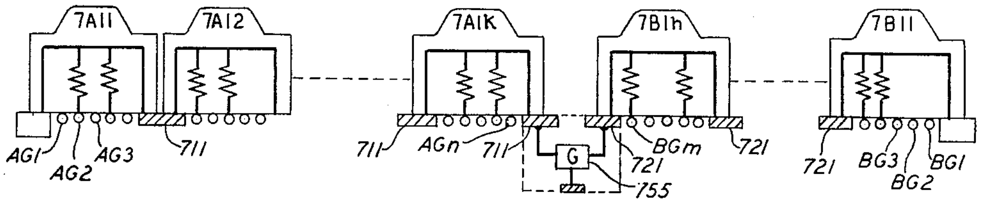
FIG. 7 is a representation of a portion of an illustrative embodiment in acocrdance with the present invention showing a plurality of groupings of small units of memory elements.

For applications requiring appreciably less than the maximum translator capacity where multidigit codes are utilized, it is not economical to provide initially the full complement of memory cards, or to prepare them individually when required. FIG. 7 illustrates an arrangement, similar to that shown in FIG. 4, in which the electrodes are organized into small units of memory, each printed circuit memory card representing an individual digit or combination of digits. Thus, each of cards 7A11 through 7A1*k* and 7B11 through 7B1*h* may represent, for example, a single decimal digit in two-out-of-five code. Accordingly, these individual digit cards may be combined to form any desired combinations of multidigit numbers in any desired translation relationship, which may be readily changed or added to. The memory cards are positioned adjacent the grid wire conductors in the manner shown in FIG. 4, the cards being supported by card support walls intermediate adjacent cards. The individual electrodes on digit cards 7A11 through 7A1*k* are interconnected via conducting strips 711 to gate 755, and the individual electrodes on digit cards 7B11 through 7B1*h* are connected via conducting strips 721 to gate 755. The connections between the electrodes and the conducting strips 711 and 721 may be established by jack terminations in the manner shown in FIG. 4. Advantageously, however, these connections may be established by merely positioning the printed connecting leads on each memory card in contact with, or adjacent to, the respective conducting strips so as to establish an electrical contact or a breakdown gap therewith, thus eliminating the jack termination 515 shown in FIG. 5. Moreover, as pointed out above, any or all of the control electrodes printed on the memory cards may also be in a touching relationship to define an electrical contact, rather than a breakdown gap, with the respective grid wire conductors.

It may be appreciated that the equipment arrangement shown in FIG. 4 is merely illustrative, and many other arrangements suitable to particular applications may be devised without departing from the principles of the present invention. For example, card holder 400 could be adapted with individual card slot openings in walls 401 and 405 to permit the memory cards to be inserted from the side. In this manner the translator circuits could be manufactured in standard units of predetermined capacity, and several units could be stacked on top of each other and interconnected to readily increase the memory capacity.

Figure 8:
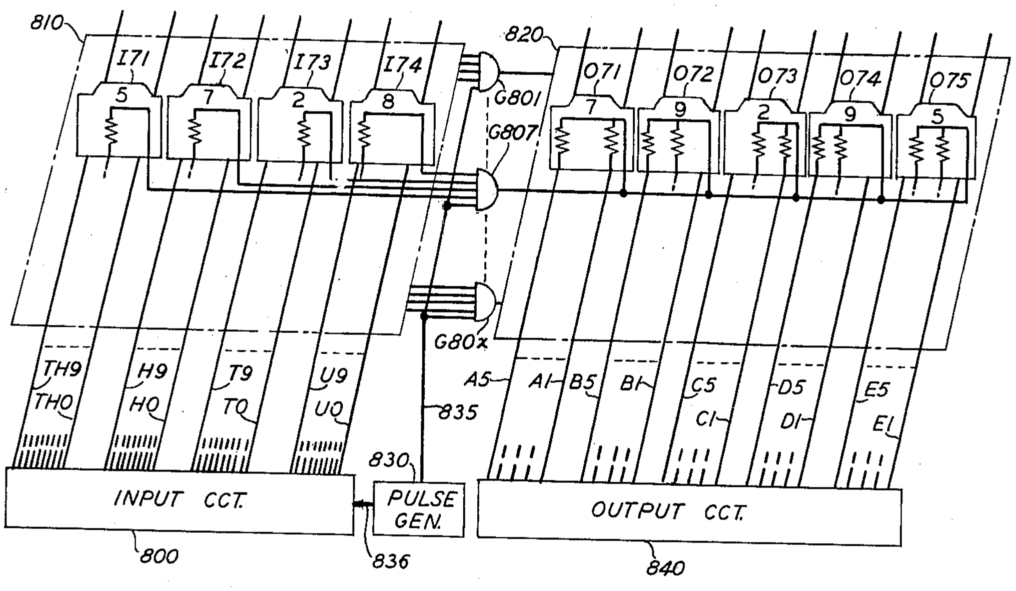
FIG. 8 is a block diagram of an additional illustrative embodiment of our invention showing an alternative form of control circuitry.

FIG. 8 illustrates an alternative form of control and gating circuitry which reduces the number of gaps which must be broken down to effect a translation, thereby reducing the translator power requirements. The particular embodiment shown in FIG. 8 effects translation from four digit, one-out-of-ten code to five digit, two-out-of-five code. The input memory portion 810 and the output memory portion 820 of the translator are each organized, as discussed in connection with FIG. 7, into small units of memory on printed circuit cards, each card comprising one or more electrodes representing an individual digit. Each control device in the translator, therefore, comprises four input memory cards, e.g., cards I71 through I74, and five output memory cards, e.g., cards O71 through O75. The electrodes of the input memory cards of each control device are connected to individual inputs of a respective one of AND gates G801 through G80*x*, which gates may comprise any of the known forms of relay, tube, solid-state, or the like, circuitry suitable for gating high-voltage pulses. The remaining input to each of the AND gates is derived from pulse generator 830 over lead 835. The output of each of AND gates G801 through G80*x* is connected to the electrodes of the associated output memory cards. Thus, AND gate G807 is connected between the electrodes of input memory cards I71 through I74 and the electrodes of output memory cards O71 through O75.

The operation of the embodiment of FIG. 8 is as follows: Pulse generator 830 provides a high-voltage pulse over lead 836 to input circuit 800, which directs the pulse to input grid wire conductors U0 through U9, T0 through T9, H0 through H9, and TH0 through TH9 in accordance with the four-digit word to be translated. Assuming the input information to be represented by the decimal digits "5728," for example, the high-voltage pulse is directed to input grid wire conductors U8 (not shown), T2 (not shown), H7 (not shown), and TH5 (not shown). This pulse effects the breakdown of the input gaps defined by grid wire conductors U8, T2, H7 and TH5, and the electrodes adjacent thereto in input portion 810. Only one control device will correspond to pulses on this particular combination of input grid wire conductors, in this case the control device comprising input memory cards I71 through I74. Therefore, only AND gate G807 will be enabled thereby to pass a concurrent, high-voltage pulse on lead 835. The AND gate G807 directs the pulse on lead 835 to the arrangement of electrodes on each of output memory cards O71 through O75. The unique combination of output gaps defined thereby is broken down to provide signals to output circuit 840 on output grid wire conductors A1 and A5, B3 (not shown) and B5, C1 and C3 (not shown), D3 (not shown) and D5, and E4 (not shown) and E2 (not shown). Thus, the output information is represented by the decimal digits "79295," encoded in this embodiment in two-out-of-five code.

Figure 9:
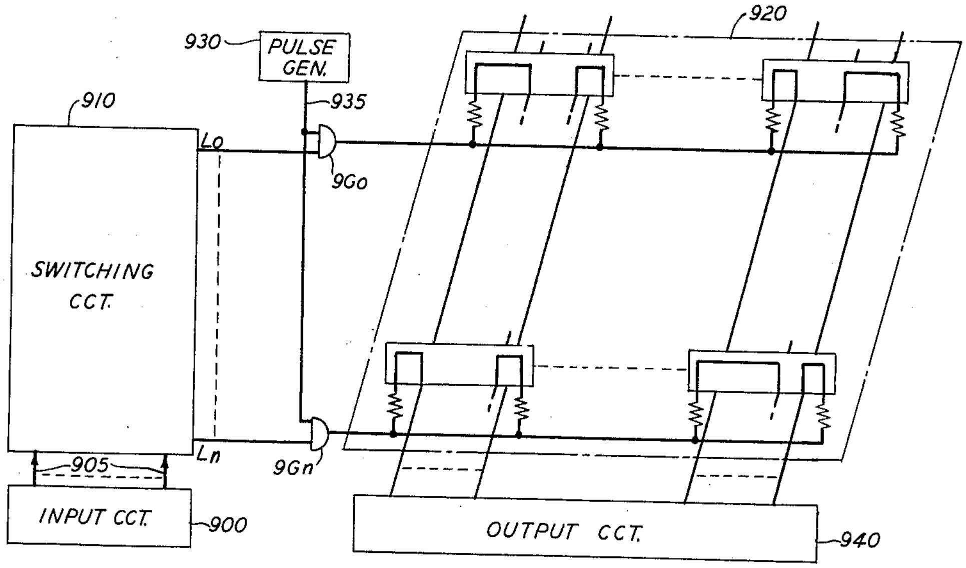
FIG. 9 is a representation of another illustrative embodiment of our invention showing an alternative arrangement of the components thereof and showing an alternative form of control circuitry.

A further illustrative embodiment in accordance with the principles of our invention is shown in FIG. 9, wherein a switching circuit 910 is employed to select individual gates 9G0 through 9G*n* to direct a high-voltage pulse from pulse generator 930 to a combination of output gaps in memory circuit 920 associated with the selected gate. Switching circuit 910 may be of any of the well-known forms, such as matrix or three-type switching circuits, which will provide a signal on a single lead L0 through L*n* in response to a combination of input signals on leads 905 representing the word to be translated. The single lead upon which the signal appears corresponds to the word to be translated, and the signal thereon enables the associated one of gates 9G0 through 9G*n*. A high-voltage pulse on lead 935 is directed through the enabled gate to the associated arrangement of electrodes to effect the breakdown of the output gaps defined thereby, in the manner described above, to provide signals on a unique combination of output grid wire conductors to output circuit 940. It will be noted that the resistance elements which are serially connected adjacent the individual breakdown gaps are shown in an alternative location in FIG. 9, i.e., removed from the memory cards upon which the control electrodes are printed.

Our invention, therefore, includes as an aspect thereof a compact, large capacity, high-speed translator circuit employing arrays of breakdown gap memory elements to provide a high degree of flexibility wherein the translation code relationships may be readily and quickly established or changed. However, in the practice of our invention and in specific illustrative embodiments thereof, the printed circuit cards, or other changeable support members on which the conductive elements are selectively placed in accordance with the translation code, may be designed so as normally to cause the ends of the elements to make conductive contact with the mating grid wire conductors. However, by providing that the remaining circuit elements and parameters are chosen to cause proper conduction through breakdown air gaps between the wire element ends and the conductors, i.e., by the choice of the energizing pulse source potential and the isolating resistances, etc., the cards or support members may be readily changed without concern for whether or not conductive contacts are in fact made. Thus, in actuality, in these embodiments of our invention even though the conductive element ends are designed to rest on the mating conductors, distortion of the cards or support members, misalignment of the cards, the presence of dirt or other alien bodies, or anything else which prevents actual contact will have no effect on the operation of the translator. In these embodiments, accordingly, only certain of the memory elements will be defined by breakdown gaps and, in fact, it may be difficult to determine which of the elements are so defined. Therefore, the translator itself is designed on the assumption that any one, or all, of the translator memory elements may be defined by an electrical discharge breakdown gap.

It is to be understood that the above-described arrangements are merely illustrative of the application of the principles of the invention. Numerous other arrangements are merely illustrative of the application of the departing from the spirit and scope of this invention.

What is claimed is:

1. A translator circuit for translating information in a first coded form to information in a second coded form comprising a plurality of input terminals, a plurality of output terminals, an input memory comprising an interchangeable array of breakdown gap patterns in accordance with the first coded form, an output memory comprising a distinct interchangeable array of breakdown gap patterns in accordance with the second coded form, means including said input memory responsive to selected combinations of input signals applied to said input terminals for providing a unique selection signal to said output memory, and means including said output memory responsive to said selection signal to provide appropriate signals in said second coded form at said output terminals.

2. A translator in accordance with claim 1 wherein said arrays of breakdown gap patterns in said input and output memories comprise a plurality of common input electrodes individually connected to said plurality of input terminals, a plurality of common output electrodes individually connected to said plurality of output terminals, a plurality of control devices individually corresponding to distinct items of information to be translated and comprising a pattern of control electrodes in accordance with the translation relationship between said first coded form and said second coded form, and means for positioning said control devices relative to said input and output electrodes such that said control electrodes form breakdown gaps with respective ones of said input and output electrodes.

3. A translator circuit for translating information in a first coded form to information in a second coded form comprising a plurality of input terminals; a plurality of output terminals; an input memory comprising an interchangeable array of breakdown gap patterns in accordance with the first coded form; an output memory comprising a distinct interchangeable array of breakdown gap patterns in accordance with the second coded form; said arrays of breakdown gap patterns in said input and output memories comprising a plurality of common input electrodes individually connected to said plurality of input terminals, a plurality of common output electrodes individually connected to said plurality of output terminals, a plurality of control devices individually corresponding to distinct items of information to be translated and comprising a pattern of control electrodes in accordance with the translation relationship between said first coded form and said second coded form, and means for positioning said control devices relative to said input and output electrodes such that said control electrodes form breakdown gaps with respective ones of said input and output electrodes; means including said input memory responsive to selected combinations of input signals applied to said input terminals for providing a unique selection signal to said output memory; said selection signal providing means including gating means individual to each of said plurality of control devices and responsive to the breakdown of gaps formed by the input electrodes and the control electrodes of the control devices to direct a breakdown potential to the gaps formed by the output electrodes and the control electrodes of said control devices; and means including said output memory responsive to said selection signal to provide appropriate signals in said second coded form at said output terminals.

4. A translator in accordance with claim 3 wherein said control device positioning means comprises apparatus having individual device receptacles adapted to receive and position each of said devices relative to said input and output electrodes and having means for selectively interconnecting said gating means and said control devices.

5. A translator comprising a first and a second group of memory devices, each device having at least one conductive electrode, a plurality of grid wire conductors positioned with respect to said electrodes so as to define a plurality of air-gap breakdown memory elements in accordance with a translation code, individual resistance elements connected in series with and immediately adjacent each of said air-gap breakdown memory elements to limit discharge across said elements due to wiring capacitance, gating means connected between each of said devices in said first group and an associated device in said second group, output signal means connected to said gating means, means for energizing selected conductors of said first group of memory devices, thereby causing one of said devices in said first group and the associated device in said second group to conduct, and means for detecting output signals on the conductors of said second group of memory devices.

6. A translator circuit for converting an *m*-out-of-*n* code to an *x*-out-of-*y* code comprising *n* input conductors, *y* output conductors, a source of energizing pulses, a first plurality of electrical discharge breakdown gaps connected to said input conductors in a pattern representative of the characters in said *m*-out-of-*n* code, a plurality of gating means not exceeding the number of distinct characters to be translated, means connecting the *m* gaps representative of a character in said *m*-out-of-*n* code to a respective one of said gating means, means connecting said source to each of said gating means, a second plurality of electrical discharge breakdown gaps connected to said output conductors in a pattern representative of the characters in said *x*-out-of-*y* code, means connecting the *x* gaps representative of a character in said *x*-out-of-*y* code to a respective one of said gating means, and input means for selectively applying energizing pulses from said source to said input conductors in accordance with the character to be translated.

7. A translator circuit in accordance with claim 6 wherein said gating means are normally enabled to pass energizing pulses from said source to said second plurality of electrical discharge breakdown gaps and wherein energizing pulses applied to selected ones of said input conductors break down all of the gaps connected to said selected input conductors to inhibit the passage of energizing pulses through the gating means connected to said gaps which are broken down.

8. A bilateral translator comprising distinct groups of first and second electrodes, first and second conductors positioned adjacent said electrodes to define breakdown gaps between said conductors and said electrodes, bilateral gating means connected between each group of first electrodes and a corresponding group of second electrodes, an output signal source, means for applying a signal to selected ones of said first conductors, means comprising the group of first electrodes adjacent said selected first conductors for enabling said gating means to apply signals from said output signal source to the corresponding group of second electrodes, and means for detecting output signals on said second conductors.

9. A translator in accordance with claim 8 further comprising symmetrically conducting impedance means individually connected in series between each group of first electrodes and said gating means and between each group of second electrodes and said gating means.

10. A translating circuit for receiving information in a first coded form and providing output information in a second coded form comprising a first plurality of conductors, one for each bit position of the received information, a first array of electrode elements, means for positioning said first array of electrode elements adjacent said first plurality of conductors in accordance with said first coded form to define a first pattern of conductive memory elements, at least certain of said first pattern conductive memory elements comprising electrical discharge breakdown gaps; a second plurality of conductors, one for each bit position of the output information, a second array of electrode elements, means for positioning said second array of electrode elements adjacent said second plurality of conductors in accordance with said second coded form to define a second pattern of conductive memory elements, at least certain of said second pattern memory elements comprising electrical discharge breakdown gaps; means for interconnecting said first array and second array of electrode elements, and means for energizing said first plurality of conductors in accordance with information in said first coded form, causing certain of said first pattern memory elements to conduct, to select and energize predetermined ones of said second plurality of conductors to provide associated output information in said second coded form.

11. A translating circuit for receiving information in a first coded form and providing output information in a second coded form comprising a first plurality of conductors, one for each bit position of the received information, a first array of electrode elements, means for positioning said first array of electrode elements adjacent said first plurality of conductors in accordance with said first coded form to define a first pattern of conductive memory elements, at least certain of said first pattern conductive memory elements comprising electrical discharge breakdown gaps; a second plurality of conductors, one for each bit position of the output information, a second array of electrode elements, means for positioning said second array of electrode elements adjacent said second plurality of conductors in accordance with said second coded form to define a second pattern of conductive memory elements, at least certain of said second pattern memory elements comprising electrical discharge breakdown gaps; said electrode array positioning means comprising a plurality of conductive bridging devices respectively associated with said electrode elements, and apparatus having individual positioning receptacles adapted to receive and position said devices in random surface proximity to said electrode elements and said conductors; means for interconnecting said first array and said second array of electrode elements; and means for energizing said first plurality of conductors in accordance with information in said first coded form, causing certain of said first pattern memory elements to conduct, to select and denergize predetermined ones of said second plurality of conductors to provide associated output information in said second coded form.

12. A translator circuit comprising input means for supplying characters to be translated, a first plurality of grid wire conductors connected to said input means, a second plurality of grid wire conductors, output means connected to said second plurality of grid wire conductors, energization pulse means, interchangeable memory means comprising a plurality of movable support members each bearing at least one electrode and a large resistance in series therewith, means for positioning said plurality of support members with respect to said first and second pluralities of grid wire conductors such that at least one of said electrodes defines a breakdown memory element with one of said grid wire conductors and the remainder of said electrodes establish electrical contact with said grid wire conductors, individual gating means for interconnecting the electrodes on predetermined groups of said support members positioned with respect to said first plurality of grid wire conductors and the electrodes on predetermined groups of said support members positioned with respect to said second plurality of grid wire conductors, and means connecting said energization pulse means to each of said individual gating means and operative upon the operation of individual of said gating means to provide an energization pulse to said support members connected thereto and positioned with respect to said second plurality of grid wire conductors.

13. In a translator circuit, an interchangeable array of memory elements comprising a plurality of common conductors, a plurality of electrodes arranged in individual groups each corresponding to information to be translated, means for positioning said individual groups of electrodes in random surface proximity with said plurality of common conductors, each electrode forming a memory element with one of said common conductors, means for selecting one of said individual groups of electrodes, and means for applying a potential to the selected group of electrodes sufficient to cause the memory elements formed thereby to conduct regardless of whether said electrodes are in electrical contact with said common conductors, whereby output signals are selectively provided on predetermined ones of said plurality of common conductors.

14. In a translator circuit in accordance with claim 13 said interchangeable array of memory elements further comprising resistance means individually connected in series with each of said memory elements.

15. In a translator circuit in accordance with claim 14 said positioning means comprises movable memory cards incorporating a conductive portion of each of said memory elements.

16. A translator circuit comprising a plurality of gates individually associated with input data words to be translated, selection matrix means responsive to individual input data words to select the associated one of said plurality of gates, a plurality of output conductors, output memory means including a plurality of memory elements arranged in distinct groups individually associated with said plurality of gates, each memory element including a discharge breakdown air gap, individual resistance means connected in series with and immediately adjacent each of said memory elements, means for selectively associating said memory elements with said plurality of output conductors, and means operative to provide a breakdown signal through a selected one of said plurality of gates to cause said associated memory elements to conduct and provide output signals on said associated output conductors.

17. An information transfer circuit comprising a plurality of output conductors, a plurality of resistive electrodes, means for interchangeably positioning said electrodes in random surface proximity with respective ones of said plurality of output conductors, each electrode forming an isolation device with a respective one of said output conductors, means for selecting individual of said electrodes, and means for applying to said selected electrodes a breakdown potential having a magnitude determined to overcome the normally occurring variations in surface proximity between said electrodes and said output conductors.

18. In an information transfer apparatus a plurality of conductive input and output paths, a plurality of coupling elements selectably positionable in random surface proximity with said input and output paths, and means for energizing at least one of said input paths and at least one of said output paths to effect a low current electrical discharge between said elements and each of said energized paths.

19. In an information transfer apparatus in accordance with claim 18 the combination further comprising individual high resistivity elements connected in each of said input paths.

20. A translator comprising a first plurality of conductors arranged in an ordered array and a second plurality of conductors, each of said second conductors having an end adjacent one of said first plurality of conductors in accordance with the translation code of the translator, means for applying pulses to said first and second conductors sufficient to cause breakdown of air-gaps between said first conductors and the ends of said second conductors, and means for preventing formation of an arc on breakdown of said air-gaps thereby preventing oscillations, said preventing means including a high resistance in series with and immediately adjacent said ends of each of said second conductors.

21. A translator in accordance with claim 20 wherein said resistances have resistance values at least of 100,000 ohms and are physically located adjacent said second conductor ends.

22. A translator comprising a plurality of conductors arranged in a parallel array and a plurality of printed circuit cards positioned perpendicular to said parallel array, each of said cards including conductive terminals positioned adjacent said conductors in accordance with the translation code of the translator and defining air-gaps therewith, and a high resistance in series with each of said terminals and directly adjacent said each terminal for preventing discharge in said air-gaps on breakdown thereof from forming an arc.

23. A translator circuit for translating information in a first coded form to information in a second coded form comprising a plurality of input terminals, a plurality of output terminals, input and output memories comprising distinct interchangeable arrays of conductive memory patterns in accordance with said first and second coded forms, respectively, said memory patterns including breakdown air gap patterns and each of said memories including an array of parallel grid wires connected to said terminals and a plurality of printed circuit cards positioned perpendicular to said grid wires and including conductive terminations selectively adjacent said grid wires in accordance with the translation relationships between said first and said second coded forms, means for applying high-voltage low current drive signals selectively to said input terminals for providing a unique selection signal for said output memory, and means under control of said selection signal for applying high-voltage low current drive signals to said output memory.

24. A translator circuit for translating information in accordance with claim 23 further comprising means adjacent each breakdown air-gap for preventing formation of an arc on breakdown thereof, said preventing means including a high resistance in series with each of said conductive termination and positioned on said printed circuit cards so as to be physically located adjacent said conductive terminations.

25. In a circuit having at least one input conductor and one output conductor, apparatus for reliably transferring electrical information from said input conductor to said output conductor comprising an isolation device having a first conductor and a second conductor one end of said first conductor being in random surface proximity to said input conductor and one end of said second conductor being in random surface proximity to said output conductor, a high resistivity element connecting said first and second conductors of said device, and means for selectively energizing said input and output conductors to effect an electrical breakdown discharge between the proximate surfaces of said first and second conductors and said input and output conductors.

26. An information transfer device comprising a frame card holder having a plurality of conductors parallely affixed therein, a plurality of printed circuit cards, frame guides in said frame for movably positioning said cards into substantially perpendicular alignment with the plane of said conductors, each of said positioned cards including at least one conductive element having an end thereof adjacent one of said conductors and having a high resistance in series with said conductive element, and a source of voltage selectively connectable between said conductive element and said one conductor, to cause conduction therebetween.

27. An information transfer device comprising a frame, a plurality of elongated, high-conductivity paths firmly positioned in said frame, a plurality of conductive path bridging members, means including at least one mating surface of said frame for selectively guiding the conductive path of said bridging members into random surface proximity with individual ones of said high conductivity paths, high resistance input means serially associated with individual ones of said conductive path bridging members, and means for applying sufficient potential to said input means to cause conduction between said input means and said high conductivity paths independent of the establishment of electrical contact therebetween.

28. An information transfer device comprising a plurality of input leads, a frame, a plurality of output leads parallely affixed in a plane of said frame, an array of cards movably inserted in said frame, each card including at least one high resistance conductive path having a first termination in random surface proximity with one of said output leads and a second termination in random surface proximity with one of said input leads, and means for providing a potential selectively to said input leads of sufficient value to establish a conducting path between said output lead and said input lead independent of whether electrical contact occurs between said first and second terminations and said input and output leads.

29. An information transfer device comprising a plurality of conductors, a plurality of changeable memory elements each including at least one conductive wire element having its end in proximity to one of said conductors, high resistance means serially connected to each of said wire elements, and means for applying sufficient potential to selected ones of said conductors and said wire elements to cause conduction therebetween independent of the establishment of electrical contact therebetween.

References Cited in the file of this patent

UNITED STATES PATENTS

| | | |
|---|---|---|
| 1,918,834 | Crago | July 18, 1933 |
| 2,182,152 | Hullegard | Dec. 5, 1939 |
| 2,861,220 | Obolensky | Nov. 18, 1958 |
| 3,007,004 | Shook | Oct. 31, 1961 |